United States Patent

[11] 3,569,636

[72] Inventor Eduard Schuller
Berlin, Germany
[21] Appl. No. 703,430
[22] Filed Feb. 6, 1968
[45] Patented Mar. 9, 1971
[73] Assignee Telefunken Patentverwertungsgesellschaft m.b.H.
Ulm Danube, Germany
[32] Priority Feb. 7, 1967
[33] Germany
[31] 33,155

[54] RECORDING AT LEAST TWO SIGNAL CHANNELS IN A COMMON GROOVE OF A MAGNETIC RECORD CARRIER
3 Claims, 7 Drawing Figs.

[52] U.S. Cl. .......... 179/100.2, 179/100.1, 179/100.4, 179/100.41
[51] Int. Cl. .......... G11b 11/20
[50] Field of Search .......... 179/100.1 (A), 100.1 (B), 100.4 (C), 100.4 (D), 100.41 (C), 100.3 (V), 15.55, 100.4 (MO), 100.41 (SJ), 100.2 (MI); 178/6.6 (TPR), 6.7 (A), 6 (BUR)

[56] References Cited

UNITED STATES PATENTS

| | | | |
|---|---|---|---|
| 3,144,650 | 8/1964 | Levine | 178/6.6 |
| 3,404,244 | 10/1968 | Revelo | 178/6.7 |
| 3,138,669 | 6/1964 | Rabinow | 179/100.3 |
| 3,401,237 | 9/1968 | Takayanagi | 179/100.4 |
| 1,910,254 | 5/1933 | Ketter | 179/100.4 |
| 1,889,380 | 11/1932 | Ruber | 179/100.2 |

FOREIGN PATENTS

| | | | |
|---|---|---|---|
| 842,831 | 7/1960 | Great Britain | 179/100.41 |

OTHER REFERENCES

Tremaine, H. M. " The Audio Cyclopedia," H. W. Sams & Co., N.Y., 1st Edition, 1959

*Primary Examiner*—Bernard Konick
*Assistant Examiner*—Raymond F. Cardillo, Jr.
*Attorney*—Spencer & Kaye

ABSTRACT: Method and means for recording two separate signal channels, pertaining, for example, to the video and audio information of a television signal, in the walls of a recording carrier groove in the form of modulated carrier signals which are to be magnetically sensed for playback.

INVENTOR
Eduard Schüller

BY Spencer & Kaye
ATTORNEYS

RECORDING AT LEAST TWO SIGNAL CHANNELS IN A COMMON GROOVE OF A MAGNETIC RECORD CARRIER

BACKGROUND OF THE INVENTION

The present invention relates to disc recording, and more particularly to the recording of several signal channels in a common groove of a record carrier. The invention also relates to a method for making such recordings and to playback devices therefor.

It is already known to record two signals in a phonograph record groove, which signals can be completely independent of each other. Crosstalk between the two signal channels is kept at a sufficiently low level because the two directions of deflection of both the cutting stylus and the playback stylus, each of which directions is associated with a respective one of the two signals, are perpendicular to each other. For example, while one signal can be recorded as vertical groove undulations, and the other signal as lateral undulations, the presently preferred manner of recording the two channels of a stereophonic signal is to cut each groove wall to form undulations at an angle of 45° to the record surface, the undulations of one channel being at right angles to those of the other channel.

It is also known to record a plurality of audio signals or a television video signal with its accompanying audio signal on a magnetic medium, preferably in tape form. This type of recording can, at relatively great expense, achieve excellent results and the potential degree of fidelity of the recording, as well as of the playback, is practically unlimited. However, all such magnetic recording methods have the common drawback that duplicate recordings can not be produced very easily. This duplication is possible only by rerecording from the original recording onto further magnetic carriers, for example, a process which requires costly instruments as well as a considerable amount of time.

In contradistinction thereto, an appreciable advantage is presented by the fact that the groove-type recording of the type used for conventional phonograph records can be duplicated, from a stamper made from the original recording, by a pressing process which requires only a few seconds for each copy produced and an expenditure only for purely mechanical devices.

There still exists the problem, however, of providing a carrier for recording at least two signals in multiple-groove form while increasing the recording capacity of the carrier so as to permit one further signal to be recorded in one groove, as compared with the number of signals recorded in the known multiple-groove recordings, or which provides the possibility, when only one audio signal is to be recorded in the groove in the usual manner, to record, in the same groove, a further signal having a considerably extended frequency range, for example, an audio signal and an additional video signal. Such carriers, which would permit the recording in one groove of one or a plurality of signals having an extended frequency range, could find further application in the general communications art, particularly in the computer art.

It has already been proposed to achieve such results by providing a record carrier composed of at least a layer of magnetizable material in which a continuous, modulated groove is provided, the groove being modulated with a first undulation component which is to be magnetically sensed and a second undulation component which is to be mechanically sensed in a conventional manner. Such a recording technique is disclosed in U.S. application Ser. No. 684,716, filed on Nov. 21 1967, by Horst Redlich and Hans-Joachim Klemp.

According to the procedure described in that application, both the first signal and the second signal are mechanically recorded, i.e., in the form of physical undulations of the groove walls, and the first signal is magnetically sensed, or scanned, while the second signal is mechanically sensed, i.e., by the physical deflections of a pickup stylus. Because the second signal is to be mechanically sensed, the tip of the pickup stylus must bear against the groove walls with a certain amount of force, termed the "tracking force," in order to assure that the groove undulations will impart the necessary spatial deflections to the stylus. As a result, the groove surface, in which the higher frequency undulations of the first signal are formed, is subject to wear, which is, of course, undesirable. The playback stylus tip, an essential portion of which is made of magnetic material, is also subject to such wear.

Moreover, for the playback of recordings made by this technique, it is necessary that the contact area between the pickup stylus tip and the groove surface have a dimension in the direction of the length of the groove which is smaller than one-half the shortest wavelength of the undulations which are to be mechanically sensed. In contrast thereto, for undulations which are to be magnetically sensed, the above-described dimension of this contact area can be, and preferably is, a multiple of the longest signal wave length.

SUMMARY OF THE INVENTION

It is a primary object of the present invention to overcome these drawbacks and difficulties.

A more specific object of the present invention is to substantially eliminate the wear to which the groove walls and pickup stylus are subjected during playback.

Another object of the present invention is to permit the length of the contact area between the pickup stylus tip and the groove walls to be substantially increased with respect to the wavelength of the groove undulation components.

Still another object of the present invention is to substantially eliminate the necessity for the playback stylus to undergo deflection movement.

Yet another object of the present invention is to substantially improve the fidelity of disc recording.

These and other objects according to the present invention are achieved by the provision of a record carrier composed of at least a layer of magnetizable material in which a continuous groove is formed. According to the invention, the groove is provided with a first undulation component constituting a spatial representation of a first carrier oscillation modulated by a first information signal and a second undulation component constituting a spatial representation of a second carrier oscillation modulated by a second information signal. The wavelength of the second oscillation is different from that of the first oscillation and both of the undulation components are to be magnetically sensed.

The present invention thus combines the advantages of two known recording methods, these being disc recording by means of a cutting stylus and magnetic recording, in such a manner that a single recording device can simultaneously produce both undulation components while a single playback element can reproduce both information signals without any mutual interference occurring between them.

However, since the recorded information does not, as in the case of known tape recordings, take the form of variations in the magnetization of the carrier, but rather is constituted by spatial undulations of the carrier groove walls, the magnetically detectable recordings according to the present invention can be duplicated by simple pressing operations comparable to those employed for producing common phonograph discs.

The isolation of the two information signals from one another during playback can be achieved in a simple manner by means of an electric filter having a single input which is connected to receive a signal representing a superposition of the two modulated carrier oscillations and two outputs at each of which appears a signal component corresponding to a respective one of the modulated carrier oscillations. In order to increase the upper frequency limits of the oscillations which can be recorded, according to the present invention, the recording operation can be carried out at a recording speed which is considerably less than that employed for replay, the recording signal being correspondingly slowed down, or time-expanded, during recording. The higher signal frequencies then appearing during playback will then permit the advantageous properties of purely magnetic sensing elements to be fully realized.

In accordance with one embodiment of the present invention, the two undulation components can be substantially linearly superimposed upon one another and recorded in the form of a depth, or hill-and-dale, recording. If the signals are recorded with sufficient linearity, any intermodulation between the two information signals or between the two modulated carrier oscillations will not be unacceptably large so that it will be possible to separate the two information signals from one another during playback by means of an electric filter as described above.

When the two carrier frequencies differ from one another by such an amount as to exceed the bandwidth of a single recording transducer, or when it might appear that a satisfactorily linear recording might not be produced, or when no special steps are to be taken to assure such linearity, the two undulation components could be recorded, according to the present invention, in respectively different directions. In this case, the spatial variations of the two undulation components would be in a deflection plane which is perpendicular to the centerline of the unmodulated groove and the deflection direction employed for producing each undulation component would be parallel to the intersection of this deflection plane with one of the groove walls. Since one undulation component will then be formed on only one groove wall, while the other undulation component will be formed only on the other groove wall, the two information signals will inherently be decoupled from one another on the record carrier.

If, in such a case, the groove is given a profile such that its walls are inclined at an angle $\alpha$ of less than 90°, for example 70°, the record carrier surface area required for a single groove will be reduced and an improved guiding accuracy for the pickup stylus will be realized.

Such a spatial separation of the two undulation components also inherently eliminates any intermodulation effects which might occur as a result of nonlinearities in the recording operation. Moreover, this spatial separation facilitates the recording of a signal having an extremely large bandwidth extending into the low frequency ranges by permitting such a signal to be separated into two parts each covering a certain portion of the large bandwidth and by recording each part on a separate groove wall. This represents a particularly effective solution to the problems created by the fact that low frequency signal components should be recorded in the form of larger amplitude undulation components in order to take account of the dependence of the playback stylus output voltage on the stylus velocity while satisfying the requirement that the output voltage be frequency-independent. By separating the recording bandwidth into two parts having respectively different amplitude levels, the otherwise unavoidable disadvantages created by the association of high frequency components with the higher amplitude low frequency components can be eliminated and these higher frequency components can be better separated from the noise level. The separation of the two signal components from each other during playback can again be effectuated by means of a filter element tuned to the carrier frequencies.

In record carriers according to the present invention, the two undulation components could carry information relating to the two channels of a stereophonic recording, or one undulation component could carry television picture information while the other carries the television sound information, or, as mentioned above, the two undulation components could carry two different frequency band portions of a single information signal.

The present invention also involves a method for recording at least two information signals in the form of undulations in a record carrier groove. The method according to the present invention is carried out by first combining a first carrier oscillation which is modulated by one of the information signals with a second carrier oscillation which is modulated by another one of the information signals and whose frequency is different from that of the first oscillation. The method then involves driving the carrier relative to a cutting stylus in contact with the surface in which the groove is to be cut for causing the stylus to cut the groove, and deflecting the stylus perpendicular to such carrier surface in accordance with the variations in the amplitude of the combined modulation oscillations to form a vertically modulated groove.

In another method according to the present invention, two information signals are recorded in the form of two spatially separated undulation components in the record carrier groove, this being carried out by modulating a first carrier oscillation by one of the information signals and modulating a second carrier oscillation, whose frequency is different from that of the first oscillation, by another one of the information signals, driving the carrier relative to a cutting stylus in contact with the surface in which the groove is to be cut for causing the stylus to cut the groove, and deflecting the stylus in a first deflection direction, perpendicular to the direction of relative movement between the carrier and the stylus, in accordance with variations in the amplitude of the first modulated oscillation and deflecting the stylus in a second deflection direction, perpendicular to the direction of relative movement between the carrier and the stylus, in accordance with variations in the amplitude in the second modulated oscillation.

The present invention also involves a playback transducer device for the record carrier according to the invention, this playback transducer device including pickup means arranged to extend into the groove and to be guided in contact with the groove walls as the carrier moves relative to the pickup means, which means include an element made of a magnetic material of at least the paramagnetic type arranged to extend into the groove. The transducer device further includes sensing coil means inductively coupled with the element for providing a playback signal which varies in accordance with the magnetic flux variations produced in the element as the pickup means moves along the groove, which playback signal is a reproduction of the combined first and second modulated carrier oscillations, and electric filter means having an input connected to the sensing coil means for separating the first and second carrier oscillation components of the playback signal from one another, the filter means having two outputs at each of which a respective one of the playback signal components appears.

In further accordance with the present invention, the pickup device, which is arranged to extend into the groove and to be guided in contact with the groove walls as the carrier moves relative to the device, has a portion which is to contact the groove walls, which portion has a dimension in the direction of relative carrier movement which is at least substantially equal to the wavelength of the longest undulation provided in the groove.

DESCRIPTION OF THE PREFERRED EMBODIMENTS

Figure 1:
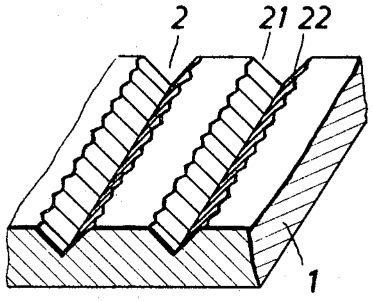
FIG. 1 is a perspective view of a portion of a record carrier provided with grooves according to the present invention.

FIG. 1 shows a portion of a record disc 1 which is made from an original recording disc by known record pressing techniques and which is to be used in the reproduction of the recorded signals. The disc 1 is made, at least in the regions into which the grooves extend, of paramagnetic or, preferably, ferromagnetic material. Grooves 2 are formed in this region, near the disc surface, the grooves having oblique walls 21 and 22. The recording of signals in the groove takes the form of spatial undulations of the groove walls.

The two information signals can be recorded by a simple vertical, or hill-and-dale, type of disc recording in which the two undulation components are combined by superimposing the two modulated carrier oscillations on one another during the recording process and feeding the combined signal to the input terminals of a vertical cutting head.

The recording process can, as is known per se, be carried out at a cutting speed which is slower than the subsequent playback speed, such recording being carried out under the control of a combined signal which has been correspondingly slowed, or time-expanded. This procedure helps to substantially eliminate the difficulties which would otherwise be created by the need for imparting high vertical accelerations to the cutting stylus for recording the higher frequency signal components.

Alternatively, the cutting head could be of the two channel-type provided with two coupled transducers each operative over a different frequency range and bandwidth and each acting to drive the stylus in such a manner that one undulation component is cut into one groove wall while the other undulation component is cut into the other groove wall.

Figure 2A:
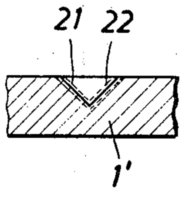
FIG. 2*a* is a cross-sectional, elevational view taken along the line *a–a* of FIG. 2*b* and showing a groove cut according to the present invention.
Figure 2B:
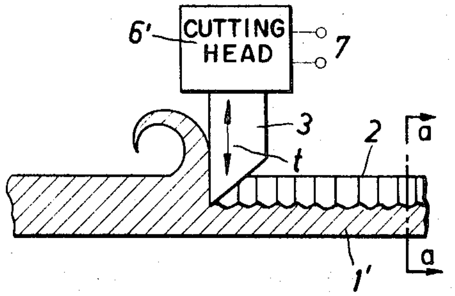
FIG. 2*b* is a cross-sectional, elevational view illustrating one manner of cutting a groove according to the present invention.

FIG. 2*b* shows, in simplified form, one arrangement which could be utilized for cutting grooves in the carrier of FIG. 1. This FIG. shows a cutting head 6′ carrying a suitable stylus 3 for cutting the modulated groove 2 into the surface of an original disc 1′. In this embodiment, the two modulated carrier oscillations having different frequencies $f_1$ and $f_2$ are superimposed on one another and fed together to the terminals 7 of the cutting head 6′. The head 6′ is of the type which deflects the stylus 3 in a vertical direction so as to produce a hill-and-dale type recording. According to this technique, the stylus 3 is deflected in the direction of the double arrows *t*, i.e., perpendicular to the surface of carrier 1′, so that its vertical position at any given time is proportional to the sum of the instantaneous values of the two modulated carrier oscillations. As previously pointed out, the two modulated carrier oscillations are superimposed upon one another during the recording process to form a combined signal which is fed to the input terminals of a vertical cutting head. Thus, the groove 2 will be provided with undulations which constitute a spatial representation of the sum of the modulated carrier oscillations. Because a vertical-type recording is being carried out, both groove walls will be provided with identical undulations.

FIG. 2*a* illustrates a groove cut in this manner wherein the unmodulated groove walls 21 and 22 are shown as solid lines, while the broken lines show the maximum and minimum groove depths resulting from the maximum and minimum deflections, respectively, of the cutting stylus.

As has already been mentioned, distortions in the groove undulation components can result in cross modulation between the two components. If no steps are to be taken to improve the linearity of the recording process, such as by using a negative feedback cutting assembly or by reducing the deflection amplitude range, it can be advantageous to physically separate the two undulation components by placing each undulation component in a respective one of the two groove walls. A cutting arrangement for producing this result is shown in FIG. 3.

Figure 3:
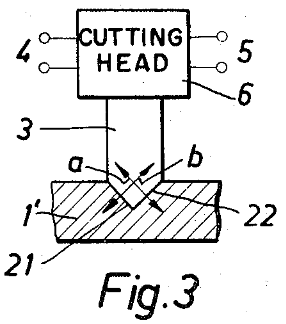
FIG. 3 is a view similar to that of FIG. 2*a* showing another manner of cutting a groove according to the present invention.

FIG. 3 shows a cutting head 6 having the general form of construction of a stereophonic disc cutter. This head is provided with two pairs of input terminals 4 and 5 through each of which is separately fed a respective one of the modulated carrier oscillations. Each pair of input terminals feeds a separate transducer which acts to deflect the stylus 3 in a respective one of the directions *a* and *b*. For example, the deflection in the direction *a* could be proportional to the signal applied to input terminal 4, while the deflection in the direction *b* would be proportional to the signal applied to input terminals 5.

When the cutting edges of the stylus 3 lie at an angle of 90° with respect to each other, and when the deflection directions *a* and *b* are perpendicular to each other, the first signal appearing at terminals 4 will be recorded in the form of undulations only in the groove wall 22, while the second signal applied to terminals 5 will be recorded in the form of undulations only of the groove wall 21. Thus, a physical superposition of the two undulation components is avoided and any distortions existing in the recorded undulation components will at least not result in a cross modulation between the two components.

Figure 4A:
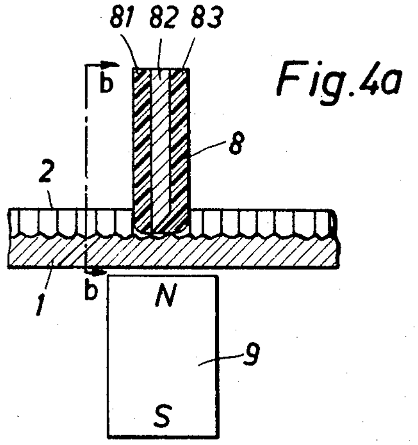
FIG. 4*a* is a view similar to that of FIG. 2*b* illustrating one magnetic playback arrangement according to the present invention.
Figure 4B:
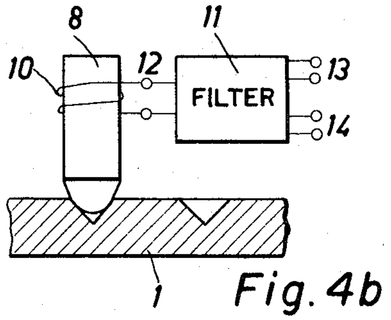
FIG. 4*b* is a cross-sectional, elevational view along the line *b–b* of FIG. 4*a*.

FIGS. 4*a* and 4*b* illustrate one playback stylus arrangement according to the present invention. This arrangement generally includes a stylus 8 which is suitably dimensioned to fit into the groove 2 and to ride along the walls 21 and 22 thereof. As is shown in FIG. 4*a*, the stylus is made up of two physically hard guide members 81 and 83 enclosing a magnetic component 82. The members 81 and 83 are of nonmagnetic material and are provided for supporting the component 82. The bottom of the stylus 8 has the general form of an ellipsoid of revolution and is suitably dimensioned and shaped so as to conform generally to the groove profile and so as to simultaneously bear upon at least several undulation ridges. Thus, the stylus is always in contact with more than one point along the groove walls and, as a result, the wear experienced by both the stylus tip and the groove is substantially reduced.

The magnetic component 82 is shaped so that it tapers at its lower end to a sharp tip. This tip extends to the surface of the ellipsoid of revolution defining the bottom of the stylus and constitutes the actual magnetic sensor of the pickup arrangement.

In order for the groove undulations to induce magnetic flux variations in component 82, it is of course necessary that some magnetic field be associated with the disc 1. In certain cases, it might occur that the magnetic material constituting at least the upper surface of the disc 1 possesses sufficient residual magnetism to produce the necessary magnetic field. If the disc itself is to be the magnetic field source, the magnetic material used should be selected to possess sufficient retentivity. However, it might also be advantageous to select a magnetically soft material having but little residual magnetism and to employ an external magnetic field during playback, which field might be produced, for example, by an auxiliary magnet 9 as shown in FIG. 4*a*.

Variations in the magnet flux induced in component 82 are the result of a "distance modulation" in that they are proportional to the separation between the sharp tip of component 82 and the groove surfaces. Since the relatively blunt edge of stylus 8 always rests on at least several peaks of the groove undulations, the distance separating the sharp tip of component 82 and the groove surfaces will be proportional to the amplitudes of the undulation components. Thus, as the stylus 8 travels along the groove, the flux induced in component 82 will be proportional to the recorded signals.

FIG. 4*b* shows an output transducer system for the stylus which includes a sensing coil 10 wound around the stylus 8, and hence magnetically coupled to component 82, and having its ends connected to output terminals 12. Across terminals 12 there will appear an output voltage corresponding to the magnetic flux variations in component 82, and hence corresponding to the signals recorded in the carrier groove.

Whether or not the record undulations have been formed in the manner described in connection with FIG. 2*b* or in the manner described in connection with FIG. 3, the output appearing across terminals 12 will be in the form of a signal representing a combination of the first modulated carrier oscillation having the frequency $f_1$ and the second modulated carrier oscillation having the frequency $f_2$. If sufficient linearity has been maintained during the recording and playback processes, cross modulation between the two components of the signal appearing across terminals 12 will not occur to any significant degree. As a result, the two signal components can be separated from one another on the basis of their differing carrier frequencies $f_1$ and $f_2$ by a suitable electronic filter 11 of a type known per se. The arrangement 11 will cause one modulated carrier oscillation to appear across output terminals 13 and the other modulated carrier oscillation to appear across terminals 14, from where they can be fed to subsequent amplifier and, if necessary, demodulating stages.

Since playback arrangements according to the present invention employ purely magnetic sensing, the pickup stylus employed is not required to undergo any deflection movements or accelerations and the stylus tip can contact a substantially larger total groove surface area than can the physically deflected styli of reproducing systems according to the prior art. The blunted tip of the pickup stylus 8 according to the present invention always contacts several undulation peaks and undergoes practically no deflection movements while traveling along the modulated groove. As a result, physical wear of the groove walls and of the stylus tip is maintained at a very low level.

In addition, the purely magnetic scanning arrangements according to the present invention are capable of detecting very high recording frequencies. This is particularly advantageous when there is not only an audio frequency information signal which is to be used to modulate one carrier oscillation, but also a video frequency signal containing television picture information which is to be recorded as the second information signal.

Moreover, since no portion of a pickup arrangement according to the invention is subjected to any physical deflection movements, all of the mass acceleration problems which plagued the prior art are eliminated and there are no longer any restrictions on the size of the pickup head. Such restrictions have always been imposed on prior art pickup heads because their weight must be kept small and because it was desired that they have relatively high frequency response. In contrast thereto, there are no such limitations imposed on the pickup arrangements according to the present invention and they can be designed purely with regard to optimizing their frequency response and overall performance. In addition, there are no size or weight limitations imposed on the sensing coil 10 and this coil can be optimally designed from the standpoint of its electrical performance.

As an alternative to orienting the two groove walls at angles of +45° and −45° with respect to the disc surface, as illustrated in FIG. 3, these walls can be placed in any other suitable position so long as adequate spatial decoupling between the undulation components in the two walls is assured. Moreover, the groove can have any other suitable form.

Figure 5:
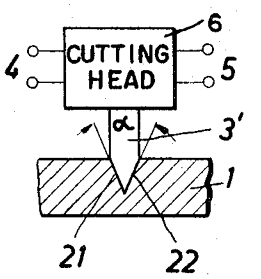
FIG. 5 is a view similar to that of FIG. 4*b* illustrating a modified groove configuration according to the present invention.

FIG. 5 illustrates another modification according to the present invention based on a cutting arrangement which is similar to that shown in FIG. 3 except that the cutting edges of the stylus 3' form between them an angle $\alpha$ which is substantially smaller than 90°. When such a stylus is employed, narrower grooves can be cut and hence the total number of grooves which can be placed on a disc surface of a given diameter can be substantially increased.

When the stylus shown in FIG. 5 is employed, the two independent deflection directions lie in a deflection plane which is perpendicular to the longitudinal centerline of the groove and each deflection direction is parallel to one of the lines of intersection of this deflection plane with the unmodulated groove walls 21 and 22. In the embodiment illustrated in FIG. 5, the two deflection directions are symmetrical with respect to a plane normal to the disc surface and tangent to the centerline of the unmodulated groove. As in the case of the embodiment illustrated in FIG. 3, each undulation component is separately recorded on a respective one of the two groove walls.

Of course, the stylus 3' of FIG. 5 could also be employed for producing a vertical-type recording of the type described in connection with FIG. *2b*.

Numerical example

Record:
- playback with 800 r.p.m.
- 70 lines/mm.
- thermoplastic material similar magnetic tape
- recording with 32 r.p.m.
- speed ratio record/replay 1:25

Video band:
- range of carrier oscillation frequencies 2 .... 3 mc.
- video band 2 mc.

Sound track:
- FM carrier system
- carrier frequency 200 kc.
- deviation range ±50 kc.
- audio band 15 kc.

Playback stylus:
- length of contact between the magnetic portion of the stylus and the surface of the groove walls 0.1 mm.
- overall length of contact between the stylus and the groove walls 0.2 0.3 mm.
- radius of curvature of the playback stylus about 3/μm It will be understood that the above description of the present invention is susceptible to various modifications, changes and adaptations, and the same are intended to be comprehended within the meaning and range of equivalents of the appended claims.

I claim:

1. A playback transducer device for a record carrier composed of at least a layer of magnetizable material in which the groove is formed, the groove being provided with a first undulation component constituting a spatial representation of a first carrier oscillation modulated by a first information signal and a second undulation component constituting a spatial representation of a second carrier oscillation, whose frequency is different from that of the first oscillation, modulated by a second information signal, comprising, in combination:

pickup means arranged to extend into the groove and to be guided in contact with the groove walls as the carrier moves relative to said means, said means including an element made of a magnetic material of at least the paramagnetic type arranged to extend into the groove;

sensing coil means inductively coupled with said element for providing a playback signal which varies in accordance with the magnetic flux variations produced in said element as said pickup means moves along the groove, which playback signal is a reproduction of the combined first and second modulated carrier oscillations; and electric filter means having an input connected to said sensing coil means for separating the first and second carrier oscillation components of said playback signal from one another, said filter means having two outputs at each of which a respective one of the playback signal components appears.

2. A pickup device for the playback of a record carrier composed of at least a layer of magnetizable material in which the groove is formed, the groove being provided with two undulation components each constituting a spatial representation of a respective carrier oscillation modulated by a respective information signal, the two oscillations having respectively different frequencies, said pickup device being arranged to extend into the groove and to be guided in contact with the groove walls as the carrier moves relative to said device, the portion of said device which is to contact the groove walls having a dimension in the direction of relative carrier movement which is at least substantially equal to the wavelength of the longest undulation provided in the groove, and said device comprising an element made of a magnetic material of at least the paramagnetic type and arranged to extend into the groove.

3. An arrangement as defined in claim 2 wherein said element tapers to a sharp edge transverse to the groove length in the region where it is to extend into the groove, said edge extending to the surface of said device which is to contact the groove walls.